US010917921B2

(12) United States Patent
Kennedy et al.

(10) Patent No.: US 10,917,921 B2
(45) Date of Patent: Feb. 9, 2021

(54) SECURE WIRELESS NETWORKS FOR VEHICLES

(71) Applicant: Platform Science, Inc., San Diego, CA (US)

(72) Inventors: John C. Kennedy, San Diego, CA (US); Scott Kopchinsky, San Diego, CA (US); Don Son, San Diego, CA (US); Jacob Fields, San Diego, CA (US)

(73) Assignee: Platform Science, Inc., San Diego, CA (US)

( * ) Notice: Subject to any disclaimer, the term of this patent is extended or adjusted under 35 U.S.C. 154(b) by 98 days.

(21) Appl. No.: 16/450,959

(22) Filed: Jun. 24, 2019

(65) Prior Publication Data
US 2020/0221511 A1  Jul. 9, 2020

Related U.S. Application Data

(63) Continuation-in-part of application No. 16/118,436, filed on Aug. 31, 2018, now Pat. No. 10,334,638.
(Continued)

(51) Int. Cl.
*H04W 76/10* (2018.01)
*H04L 29/08* (2006.01)
(Continued)

(52) U.S. Cl.
CPC ............ *H04W 76/10* (2018.02); *H04L 67/12* (2013.01); *H04W 76/19* (2018.02); *H04W 84/005* (2013.01); *H04W 84/12* (2013.01)

(58) Field of Classification Search
CPC ..... H04W 76/10; H04W 76/19; H04W 8/005; H04L 29/08; H04L 67/12
See application file for complete search history.

(56) References Cited

U.S. PATENT DOCUMENTS 5,579,233 A    11/1996 Burns
5,954,773 A    9/1999 Luper
(Continued)

FOREIGN PATENT DOCUMENTS

WO    WO2016/012064    1/2016

OTHER PUBLICATIONS

International Search Report for PCT Application PCT/US2017/037825, dated Sep. 21, 2017.
(Continued)

*Primary Examiner* — Kyaw Z Soe
(74) *Attorney, Agent, or Firm* — Clause Eight IPS; Michael Catania

(57) ABSTRACT

A system and method (600) of securely and accurately connecting mobile devices (110) to wireless networks in vehicles (210) by using encrypted wireless network configurations based on vehicle specific data is disclosed herein. The system comprises a vehicle (210) comprising an on-board computer (232) with a memory (231) having a vehicle identification number (233), a connector plug (235), and an motorized engine (234), a connected vehicle device (130) comprising a processor, a WiFi radio, a BLUETOOTH radio, a memory, and a connector for mating with the connector plug of the vehicle (210), and a mobile device (110) comprising a graphical user interface (335), a processor (310), a WiFi radio (307), a BLUETOOTH radio (306), and a cellular network interface (308).

20 Claims, 8 Drawing Sheets

Related U.S. Application Data which is a continuation of application No. 15/917,633, filed on Mar. 11, 2018, now Pat. No. 10,070,471, which is a continuation of application No. 15/624,814, filed on Jun. 16, 2017, now Pat. No. 9,961,710.

(60) Provisional application No. 62/352,014, filed on Jun. 19, 2016.

(51) Int. Cl.
*H04W 76/19* (2018.01)
*H04W 84/12* (2009.01)
*H04W 84/00* (2009.01)

(56) References Cited

U.S. PATENT DOCUMENTS

| | | | |
|---|---|---|---|
| 5,995,898 A | 11/1999 | Tuttle | |
| 6,292,724 B1 | 9/2001 | Apsell et al. | |
| 6,526,341 B1 | 2/2003 | Bird et al. | |
| 6,611,686 B1 | 8/2003 | Smith et al. | |
| 6,651,001 B2 | 11/2003 | Apsell | |
| 6,735,150 B2 | 5/2004 | Rothman | |
| 6,925,308 B2 | 8/2005 | Goldsmith et al. | |
| 7,043,365 B2 | 5/2006 | Inbar et al. | |
| 7,079,230 B1 | 7/2006 | McInerney et al. | |
| 7,092,803 B2 | 8/2006 | Kapolka et al. | |
| 7,327,250 B2 | 2/2008 | Harvey | |
| 7,350,707 B2 | 4/2008 | Barkan | |
| 7,555,378 B2 | 6/2009 | Larschan et al. | |
| 7,616,105 B2 | 11/2009 | Macielinski et al. | |
| 7,725,216 B2 | 5/2010 | Kim | |
| 8,626,144 B2 | 1/2014 | Talty et al. | |
| 8,626,568 B2 | 1/2014 | Warkentin et al. | |
| 8,789,161 B2 | 7/2014 | Jeal | |
| 8,855,626 B2 | 10/2014 | O'Toole et al. | |
| 9,032,493 B2 | 5/2015 | Lortz et al. | |
| 9,064,422 B2 | 6/2015 | Mohn et al. | |
| 9,147,335 B2 | 9/2015 | Raghunathan et al. | |
| 9,215,590 B2 | 12/2015 | Bondesen et al. | |
| 9,262,934 B2 | 2/2016 | Mohn et al. | |
| 9,376,090 B2 | 6/2016 | Gennermann | |
| 9,390,628 B2 | 7/2016 | Mohn et al. | |
| 9,445,447 B2 | 9/2016 | Pal et al. | |
| 9,544,768 B2 | 1/2017 | Steffey et al. | |
| 9,578,668 B2 | 2/2017 | Sim | |
| 9,632,506 B2 | 4/2017 | Wellman et al. | |
| 9,961,710 B2 | 5/2018 | Son et al. | |
| 10,070,471 B2 | 9/2018 | Son et al. | |
| 10,255,575 B2 | 4/2019 | Warkentin et al. | |
| 10,255,606 B2 | 4/2019 | Harter et al. | |
| 10,334,638 B2 | 6/2019 | Son et al. | |
| 10,475,258 B1 | 11/2019 | Son et al. | |
| 2008/0137860 A1 | 6/2008 | Silvernail | |
| 2009/0099724 A1 | 4/2009 | Kranz et al. | |
| 2009/0276115 A1 | 11/2009 | Chen | |
| 2011/0080256 A1 | 4/2011 | Mehalschick, Sr. | |
| 2012/0161927 A1 | 6/2012 | Pierfelice et al. | |
| 2012/0254960 A1 | 10/2012 | Lortz et al. | |
| 2012/0262283 A1 | 10/2012 | Biondo et al. | |
| 2013/0017816 A1 | 1/2013 | Talty et al. | |
| 2013/0046846 A1 | 2/2013 | Mason et al. | |
| 2013/0304276 A1 | 11/2013 | Flies | |
| 2014/0162598 A1 | 6/2014 | Villa-Real | |
| 2014/0213176 A1 | 7/2014 | Mendelson | |
| 2014/0223235 A1 | 8/2014 | Gundlapalli et al. | |
| 2014/0232569 A1 | 8/2014 | Skinder et al. | |
| 2015/0099500 A1 | 4/2015 | Chalmers | |
| 2015/0120135 A1 | 4/2015 | Lawrenson | |
| 2015/0215986 A1 | 7/2015 | Lei et al. | |
| 2015/0339334 A1 | 11/2015 | Hanke | |
| 2015/0365979 A1 | 12/2015 | Park | |
| 2016/0011001 A1 | 1/2016 | Emory et al. | |
| 2016/0066127 A1 | 3/2016 | Choi et al. | |
| 2016/0084657 A1 | 3/2016 | Schilling et al. | |
| 2016/0150588 A1 | 5/2016 | Yae | |
| 2016/0247153 A1 | 8/2016 | Leseky | |
| 2016/0277923 A1 | 9/2016 | Steffey et al. | |
| 2016/0343255 A1 | 11/2016 | Warren | |
| 2017/0011561 A1 | 1/2017 | Makke et al. | |
| 2017/0017927 A1 | 1/2017 | Domnick et al. | |
| 2017/0104728 A1* | 4/2017 | Girard | H04W 12/001 |
| 2017/0178035 A1* | 6/2017 | Grimm | G06Q 10/02 |
| 2018/0376522 A1 | 12/2018 | Son et al. | |

OTHER PUBLICATIONS

European Search Report for EP Application 17815967.9 dated Dec. 4, 2019.
Office Action for U.S. Appl. No. 15/624,814, dated Aug. 22, 2017.
International Search Report and Written Opinion for PCT Application PCT/US2020/032389, dated Jul. 2, 2020.
International Search Report and Written Opinion for PCT Application PCT/US2020/027032, dated May 28, 2020.

* cited by examiner

US 10,917,921 B2

SECURE WIRELESS NETWORKS FOR VEHICLES

CROSS REFERENCE TO RELATED APPLICATION

The Present Application is a continuation-in-part application of U.S. patent application Ser. No. 16/118,436, filed on Aug. 31, 2018, which is a continuation application of U.S. patent application Ser. No. 15/917,633, filed on Mar. 11, 2018, now U.S. Pat. No. 10,070,471, issued on Sep. 4, 2018, which is a continuation application of U.S. patent application Ser. No. 15/624,814, filed on Jun. 16, 2017, now U.S. Pat. No. 9,961,710, issued on May 1, 2018, which claims priority to U.S. Provisional Patent Application No. 62/352,014, filed on Jun. 19, 2016, each of which is hereby incorporated by reference in its entirety.

STATEMENT REGARDING FEDERALLY SPONSORED RESEARCH OR DEVELOPMENT

Not Applicable

BACKGROUND OF THE INVENTION

Field of the Invention

The present invention generally relates to wireless networks for vehicles.

Description of the Related Art

The prior art discusses various techniques for wireless networks for vehicles.

U.S. Pat. No. 9,215,590 for Authentication Using Vehicle Data Pairing discloses the wireless pairing of a portable device with an on-board computer of a vehicle for authenticating a transaction with a third party.

General definitions for terms utilized in the pertinent art are set forth below.

Beacon is a management frame that contains all of the information about a network. In a WLAN, Beacon frames are periodically transmitted to announce the presence of the network.

BLUETOOTH technology is a standard short range radio link that operates in the unlicensed 2.4 gigaHertz band.

Code Division Multiple Access ("CDMA") is a spread spectrum communication system used in second generation and third generation cellular networks, and is described in U.S. Pat. No. 4,901,307.

FTP or File Transfer Protocol is a protocol for moving files over the Internet from one computer to another.

GSM, Global System for Mobile Communications is a second generation digital cellular network.

Hypertext Transfer Protocol ("HTTP") is a set of conventions for controlling the transfer of information via the Internet from a web server computer to a client computer, and also from a client computer to a web server, and Hypertext Transfer Protocol Secure ("HTTPS") is a communications protocol for secure communication via a network from a web server computer to a client computer, and also from a client computer to a web server by at a minimum verifying the authenticity of a web site.

Internet is the worldwide, decentralized totality of server computers and data-transmission paths which can supply information to a connected and browser-equipped client computer, and can receive and forward information entered from the client computer.

Media Access Control (MAC) Address is a unique identifier assigned to a device by a manufacturer of the device.

Memory generally includes any type of integrated circuit or storage device configured for storing digital data including without limitation ROM, PROM, EEPROM, DRAM, SDRAM, SRAM, flash memory, and the like.

Organizationally Unique Identifier (OUI) is a 24-bit number that uniquely identifies a vendor, manufacturer, or organization on a worldwide basis. The OUI is used to help distinguish both physical devices and software, such as a network protocol, that belong to one entity from those that belong to another.

Probe Request: A frame that contains the advertisement IE for a device that is seeking to establish a connection with a proximate device.

Probe Response: A frame that contains the advertisement IE for a device. The Probe Response is sent in response to a Probe Request.

Processor generally includes all types of processors including without limitation microprocessors, general purpose processors, gate arrays, array processors, application specific integrated circuits (ASICs) and digital signal processors.

SSID (Service Set Identifier) is a 1 to 32 byte string that uniquely names a wireless local area network.

Transfer Control Protocol/Internet Protocol ("TCP/IP") is a protocol for moving files over the Internet.

URL or Uniform Resource Locator is an address on the World Wide Web.

User Interface or UI is the junction between a user and a computer program. An interface is a set of commands or menus through which a user communicates with a program. A command driven interface is one in which the user enter commands. A menu-driven interface is one in which the user selects command choices from various menus displayed on the screen.

Web-Browser is a complex software program, resident in a client computer, that is capable of loading and displaying text and images and exhibiting behaviors as encoded in HTML (HyperText Markup Language) from the Internet, and also from the client computer's memory. Major browsers include MICROSOFT INTERNET EXPLORER, NETSCAPE, APPLE SAFARI, MOZILLA FIREFOX, and OPERA.

Web-Server is a computer able to simultaneously manage many Internet information-exchange processes at the same time. Normally, server computers are more powerful than client computers, and are administratively and/or geographically centralized. An interactive-form information-collection process generally is controlled from a server computer, to which the sponsor of the process has access.

Wireless Application Protocol ("WAP") is an open, global specification that empowers users with mobile wireless communication devices (such as mobile phones) to easily access data and to interact with Websites over the Internet through such mobile wireless communication device. WAP works with most wireless communication networks such as CDPD, CDMA, GSM, PDC, PHS, TDMA, FLEX, reflex, iDEN, TETRA, DECT, DataTAC, Mobitex and GRPS. WAP can be built on most operating systems including PalmOS, WINDOWS, CE, FLEXOS, OS/9, JavaOS and others.

WAP Push is defined as an encoded WAP content message delivered (pushed) to a mobile communication device which includes a link to a WAP address.

Wireless AP (access point) is a node on the wireless local area network (WLAN) that allows wireless devices to connect to a wired network using Wi-Fi, or related standards.

There is a need for securely connecting multiple devices to a single access point in a vehicle, while preventing malicious users from detecting and connecting to a wireless network published on a vehicle.

BRIEF SUMMARY OF THE INVENTION

The present invention provides a system and method of securely and accurately connecting mobile devices to wireless networks in vehicles by using encrypted wireless network configurations based on vehicle specific data.

One aspect of the present invention is a system for vehicle to mobile device secure wireless communications. The system comprises a vehicle comprising an on-board computer with a memory having a vehicle identification number (VIN), a connector plug, and an motorized engine, a connected vehicle device (CVD) comprising a processor, a WiFi radio, a BLUETOOTH radio, a memory, and a connector for mating with the connector plug of the vehicle, and a mobile device comprising a graphical user interface, a processor, a WiFi radio, a BLUETOOTH radio, and a cellular network interface. The CVD is configured to broadcast BLUETOOTH or BLUETOOTH low energy connection in a hidden mode. The mobile device is configured to search for a vehicle having a CVD broadcasting the BLUETOOTH or BLUETOOTH low energy connection in the hidden mode. The mobile device is configured to pair with the CVD.

Another aspect of the present invention is a method for a secure connection to a wireless network of a vehicle. The method includes broadcasting a BLUETOOTH or BLUETOOTH low energy connection having a BLUETOOTH advertisement from a CVD connected to an on-board computer of a vehicle. The method also includes searching at a mobile device for a vehicle having a CVD broadcasting the BLUETOOTH or BLUETOOTH low energy connection having the BLUETOOTH advertisement. The method also includes pairing the mobile device with the CVD.

Yet another aspect of the present invention is a system for vehicle to mobile device secure wireless communications utilizing BLUETOOTH. The system comprises a vehicle comprising an on-board computer with a memory having a vehicle identification number (VIN), a connector plug, and an motorized engine, a connected vehicle device (CVD) comprising a processor, a WiFi radio, a BLUETOOTH radio, a memory, and a connector for mating with the connector plug of the vehicle, and a mobile device comprising a graphical user interface, a processor, a WiFi radio, a BLUETOOTH radio, and a cellular network interface. The CVD is configured in a hidden mode of BLUETOOTH or BLUETOOTH low energy to receive a signal including a MAC address of the CVD. The mobile device is configured to search for a vehicle having the CVD by transmitting a BLUETOOTH or BLUETOOTH low energy connection with the MAC address of the CVD. The mobile device is configured to link with the CVD.

Yet another aspect of the present invention is a system for vehicle to mobile device secure wireless communications utilizing BLUETOOTH. The system comprises a vehicle comprising an on-board computer with a memory having a vehicle identification number (VIN), a connector plug, and an motorized engine, a connected vehicle device (CVD) comprising a processor, a WiFi radio, a BLUETOOTH radio, a memory, and a connector for mating with the connector plug of the vehicle, and a mobile device comprising a graphical user interface, a processor, a WiFi radio, a BLUETOOTH radio, and a cellular network interface. The CVD is configured to broadcast BLUETOOTH or BLUETOOTH low energy connection in a hidden mode. The mobile device is configured to search for a vehicle having a CVD broadcasting the BLUETOOTH or BLUETOOTH low energy connection in the hidden mode. The mobile device is configured to pair with the CVD using a certificate with a second field, in which the mobile device has a pairing code (e.g., MAC address for the CVD) for the second field.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

Figure 1:
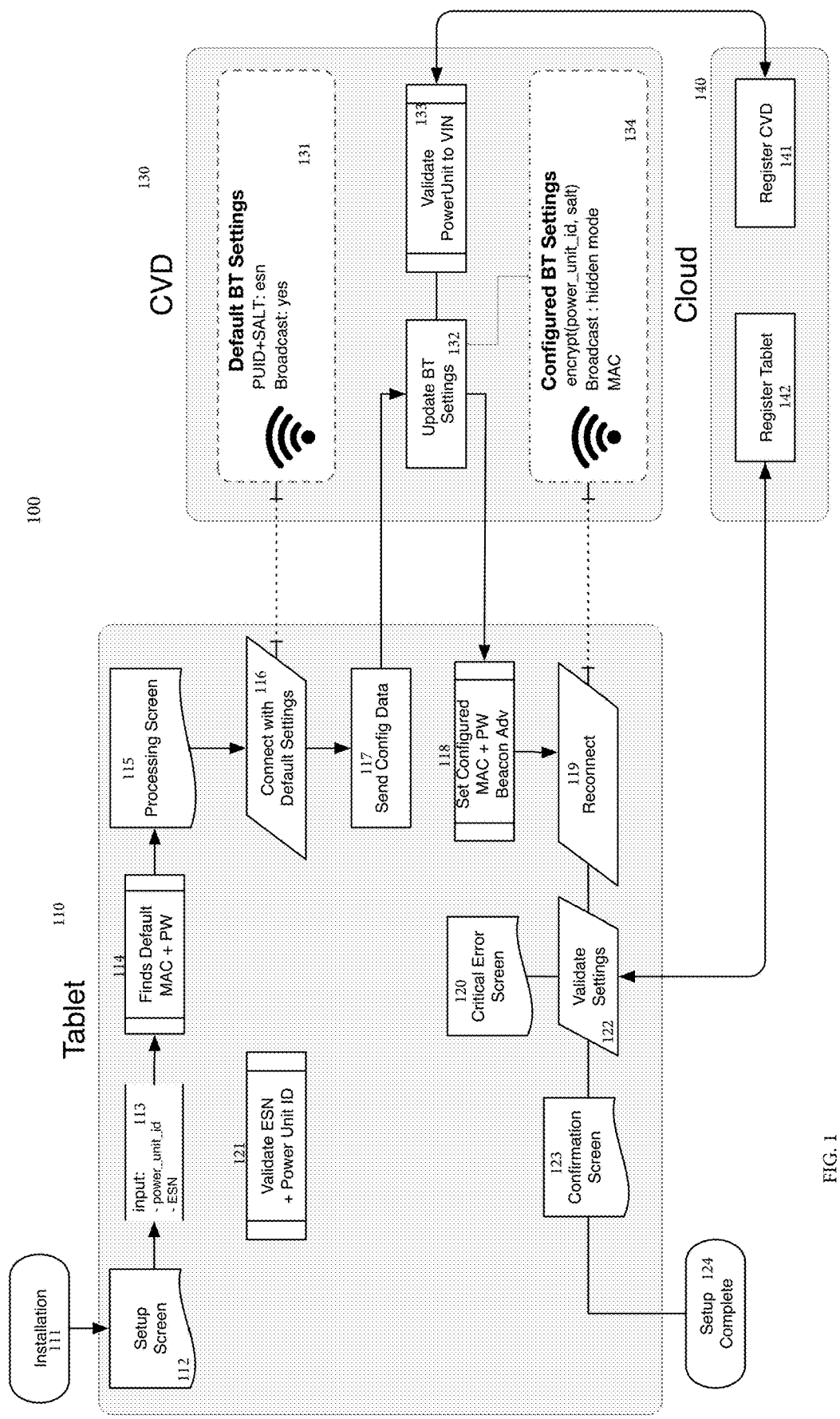
FIG. 1 is a block diagram of system for securely connecting a wireless device to a single access point in a vehicle.
Figure 2:
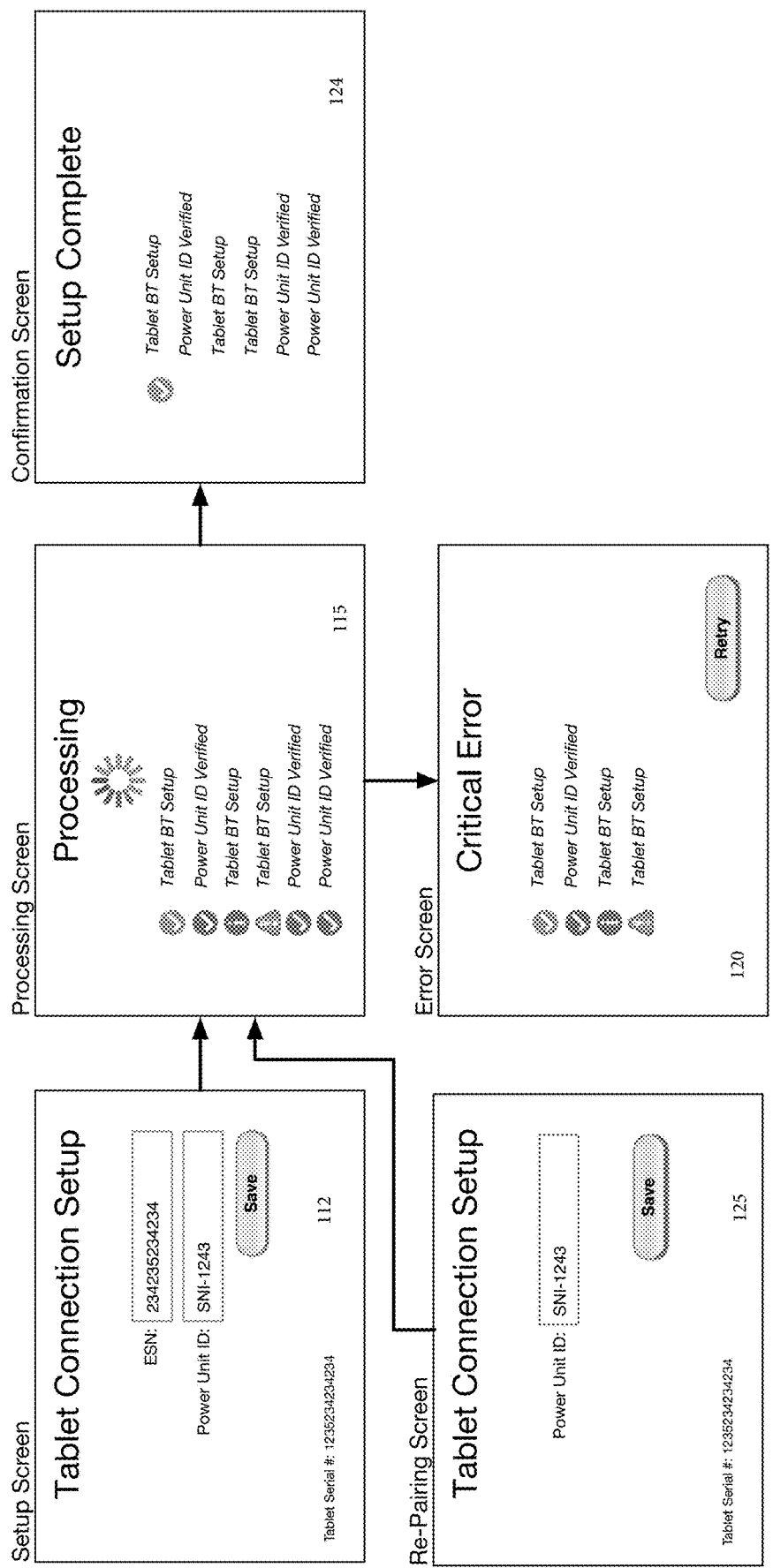
FIG. 2 is a block diagram of system for securely connecting a wireless device to a single access point in a vehicle.

FIGS. 1 and 2 illustrate a pairing process for a system 100 for securely connecting a wireless device to a single access point in a vehicle. The secure connection is preferably established between a tablet computer 110 and connected vehicle device ("CVD") 130. The CVD 130 is preferably physically connected to an on-board computer of a vehicle. The vehicle is preferably a delivery truck or a long-haul semi-truck. The CVD 130 uses a BLUETOOTH signal that is broadcast in a hidden mode, and thus the wireless network is unpublished. The tablet computer 110, having previously paired with the CVD 130, is used to "find" or re-pair with the wireless network of the CVD 130 since the BLUETOOTH settings are retained in a memory of the tablet computer 130. At block 111, the installation begins for the tablet computer 110. At block 112, a setup screen having an ESN, a power unit identification and a tablet computer serial number is displayed. At block 113, the identifications are inputted, and at block 121 they are validated. At block 114, it finds the hidden mode BLUETOOTH signal plus the password. The BLUETOOTH signal preferably comprises a MAC address for the CVD. At block 115, the processing occurs including the processing of the tablet computer setup and the verification of the power unit identification. At block 116, it connects with the default settings to the CVD 130 pairing with the default settings 131 of the CVD 130. At block 117, the tablet computer sends configuration data to the CVD 130. At block 132, the CVD 130 updates the BLUETOOTH settings and at block 133 validates the power unit to the VIN. At block 140, the CVD 130 is registered with a cloud computing service 140, and at block 142, the tablet computer is registered with the cloud computing service 140. At block 118, the tablet computer 110 sets the configured MAC address and password from the CVD 130. At block 119, the tablet computer 110 reconnects with the configured hidden mode BLUETOOTH settings. At block 134 on the CVD 130, the configured hidden mode BLUETOOTH settings include the MAC address: encrypt (power unit identification salt) and the BLUETOOTH signal is broadcast in the hidden mode. At block 122, the settings are validated on the tablet computer 110, or the tablet computer 110 and the CVD 130 utilize a traditional BLUETOOTH certificate pairing (Host and Client). Alternatively at block 122, the settings are validated on the tablet computer 110, and the tablet computer 110 and the CVD 130 utilize a traditional BLUETOOTH certificate pairing (Host and Client) as a secondary authentication. In an alternative to utilizing the traditional BLUETOOTH certificate pairing, the certificate has a second field which must be submitted for pairing and re-pairing. The second field may include the MAC address of the CVD 130. During a traditional BLUETOOTH pairing, the CVD 130 and the tablet computer 110 establish a relationship by creating a link key. The CVD 130 and the tablet computer 110 store the same link key to be paired. The tablet computer 110 can cryptographically authenticate the identity of the CVD 130, ensuring it is the same CVD it previously paired with. Once a link key is generated, an authenticated asynchronous connection-less link between the CVD 130 and the tablet computer 110 is encrypted to protect transmitted data. Block 120 is a critical error screen in which the tablet connection setup failed or the power unit identification was not verified. At block 123, a confirmation screen is shown on the tablet computer 110. At block 124, the setup is complete. At block 125, a tablet hidden mode BLUETOOTH setup re-pairing screen is shown.

Figure 3:
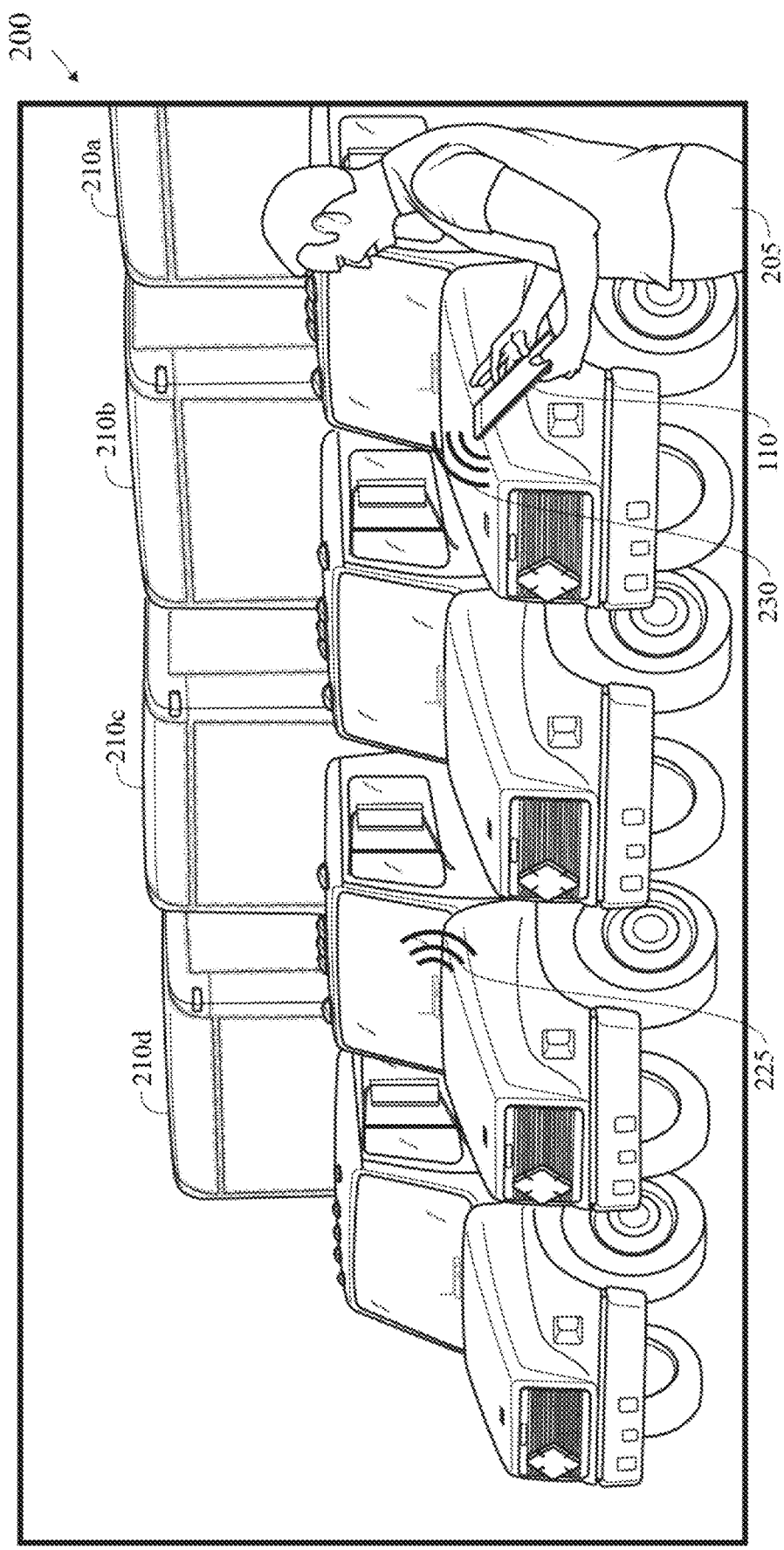
FIG. 3 is an illustration of a driver identifying a vehicle through connection of a tablet computer to an unpublished network.

As shown in FIG. 3, each of a multitude of trucks 210a-210d broadcast a wireless signal for a truck specific network, with one truck 210c broadcasting a hidden mode BLUETOOTH wireless signal 225. Since the hidden mode BLUETOOTH is not published, only a driver is already in possession of the hidden mode BLUETOOTH signal can pair the tablet computer 110 with the CVD 130 of the truck 210 to which the driver is assigned. So even though the hidden mode BLUETOOTH wireless signals are being "broadcast", they will not appear on a driver's tablet computer 110 (or other mobile device) unless the tablet computer 110 has already been paired with the CVD 130 of the vehicle 210. A driver 205 in possession of a tablet computer 110 pairs, using a signal 230, the tablet computer 110 with the wireless network 225 of the CVD of the truck 210c, and thus the driver locates the specific truck 210c he is assigned to in a parking lot full of identical looking trucks 210a-d.

For example, on an IPHONE® device from Apple, Inc., the "UDID," or Unique Device Identifier is a combination of forty numbers and letters, and is set by Apple and stays with the device forever.

For example, on an ANDROID based system, one that uses Google Inc.'s ANDROID operating system, the ID is set by Google and created when an end-user first boots up the device. The ID remains the same unless the user does a "factory reset" of the phone, which deletes the phone's data and settings.

The mobile communication device 110, or mobile device, is preferably selected from mobile phones, smartphones, tablet computers, PDAs and the like. Examples of smartphones and the device vendors include the IPHONE® smartphone from Apple, Inc., the DROID® smartphone from Motorola Mobility Inc., GALAXY S® smartphones from Samsung Electronics Co., Ltd., and many more. Examples of tablet computing devices include the IPAD® tablet computer from Apple Inc., and the XOOM™ tablet computer from Motorola Mobility Inc.

The mobile communication device 110 then a communication network utilized preferably originates from a mobile communication service provider (aka phone carrier) of the customer such as VERIZON, AT&T, SPRINT, T-MOBILE, and the like mobile communication service providers, provide the communication network for communication to the mobile communication device of the end user.

Wireless standards utilized include 802.11a, 802.11b, 802.11g, AX.25, 3G, CDPD, CDMA, GSM, GPRS, radio, microwave, laser, Bluetooth, 802.15, 802.16, and IrDA.

BLUETOOTH™ technology operates in the unlicensed 2.4 GHz band of the radio-frequency spectrum, and in a preferred embodiment the secondary device 30 and/or primary device 25 is capable of receiving and transmitting signals using BLUETOOTH™ technology. LTE Frequency Bands include 698-798 MHz (Band 12, 13, 14, 17); 791-960 MHz (Band 5, 6, 8, 18, 19, 20); 1710-2170 MHz (Band 1, 2, 3, 4, 9, 10, 23, 25, 33, 34, 35, 36, 37, 39); 1427-1660.5 MHz (Band 11, 21, 24); 2300-2700 MHz (Band 7, 38, 40, 41); 3400-3800 MHz (Band 22, 42, 43), and in a preferred embodiment the secondary device 30 and/or the primary device 25 is capable of receiving and transmitting signals using one or more of the LTE frequency bands. WiFi preferably operates using 802.11a, 802.11b, 802.11g, 802.11n communication formats as set for the by the IEEE, and in in a preferred embodiment the secondary device 30 and/or the primary device 25 is capable of receiving and transmitting signals using one or more of the 802.11 communication formats. Near-field communications (NFC) may also be utilized.

Figure 4:
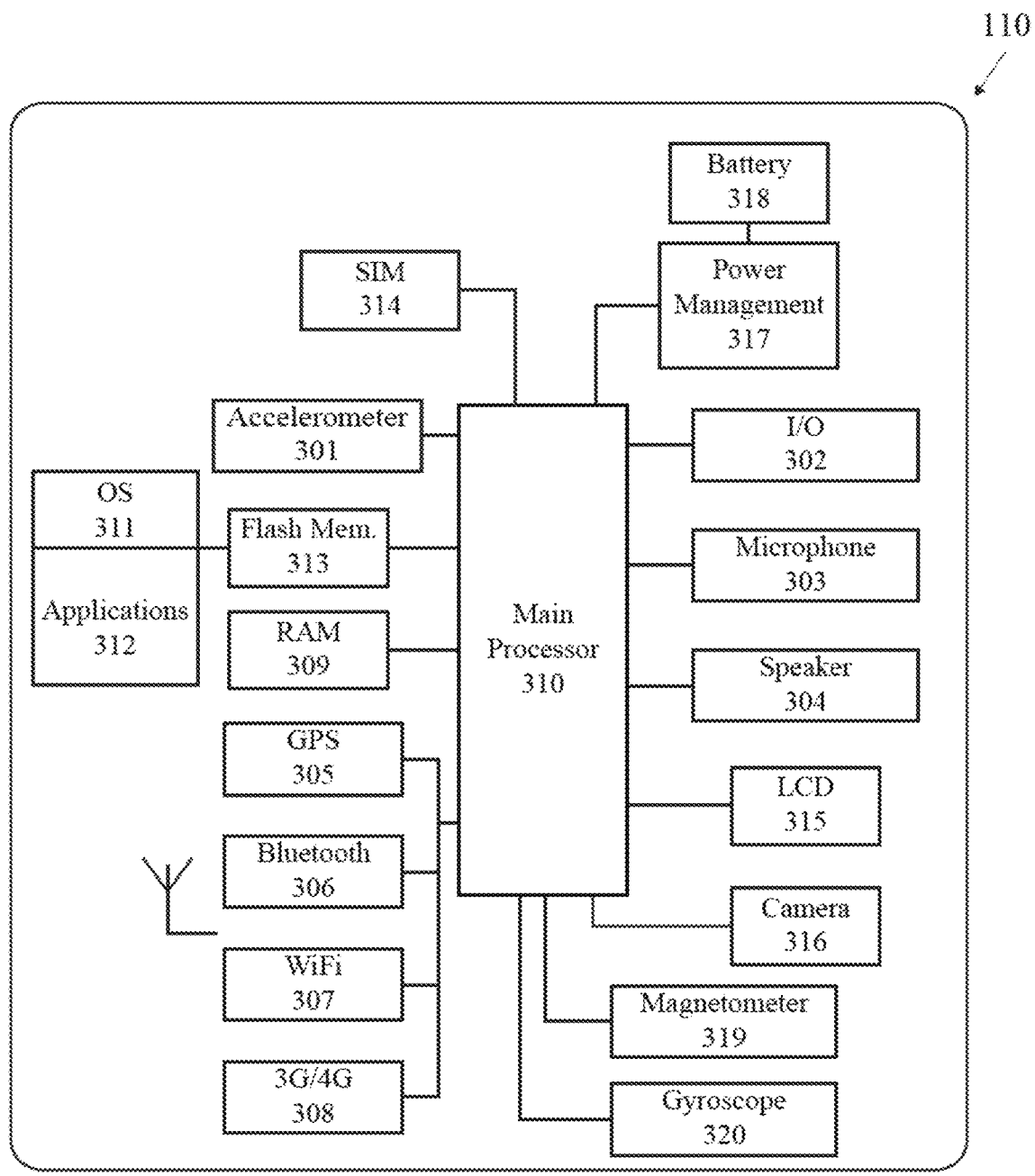
FIG. 4 is an isolated view of general electrical components of a mobile communication device.

As shown in FIG. 4, a typical mobile communication device 110 preferably includes an accelerometer 301, I/O (input/output) 302, a microphone 303, a speaker 304, a GPS chipset 305, a Bluetooth component 306, a Wi-Fi component 307, a 3G/4G component 308, RAM memory 309, a main processor 310, an OS (operating system) 311, applications/software 312, a Flash memory 313, SIM card 314, LCD display 315, a camera 316, a power management circuit 317, a battery 318 or power source, a magnetometer 319, and a gyroscope 320.

Each of the interface descriptions preferably discloses use of at least one communication protocol to establish handshaking or bi-directional communications. These protocols preferably include but are not limited to XML, HTTP, TCP/IP, Serial, UDP, FTP, Web Services, WAP, SMTP, SMPP, DTS, Stored Procedures, Import/Export, Global Positioning Triangulation, IM, SMS, MMS, GPRS and Flash. Databases that may be used with the system preferably include but are not limited to MSSQL, Access, MySQL, Progress, Oracle, DB2, Open Source DBs and others. Operating system used with the system preferably include Microsoft 2010, XP, Vista, 200o Server, 2003 Server, 2008 Server, Windows Mobile, Linux, Android, Unix, I series, AS 400 and Apple OS.

The underlying protocol at the cloud server 140, is preferably Internet Protocol Suite (Transfer Control Protocol/Internet Protocol ("TCP/IP")), and the transmission protocol to receive a file is preferably a file transfer protocol ("FTP"), Hypertext Transfer Protocol ("HTTP"), Secure Hypertext Transfer Protocol ("HTTPS") or other similar protocols. The transmission protocol ranges from SIP to MGCP to FTP and beyond. The protocol at the authentication server 40 is most preferably HTTPS.

Wireless standards include 802.11a, 802.11b, 802.11g, AX.25, 3G, CDPD, CDMA, GSM, GPRS, radio, microwave, laser, Bluetooth, 802.15, 802.16, and IrDA.

Figure 5:
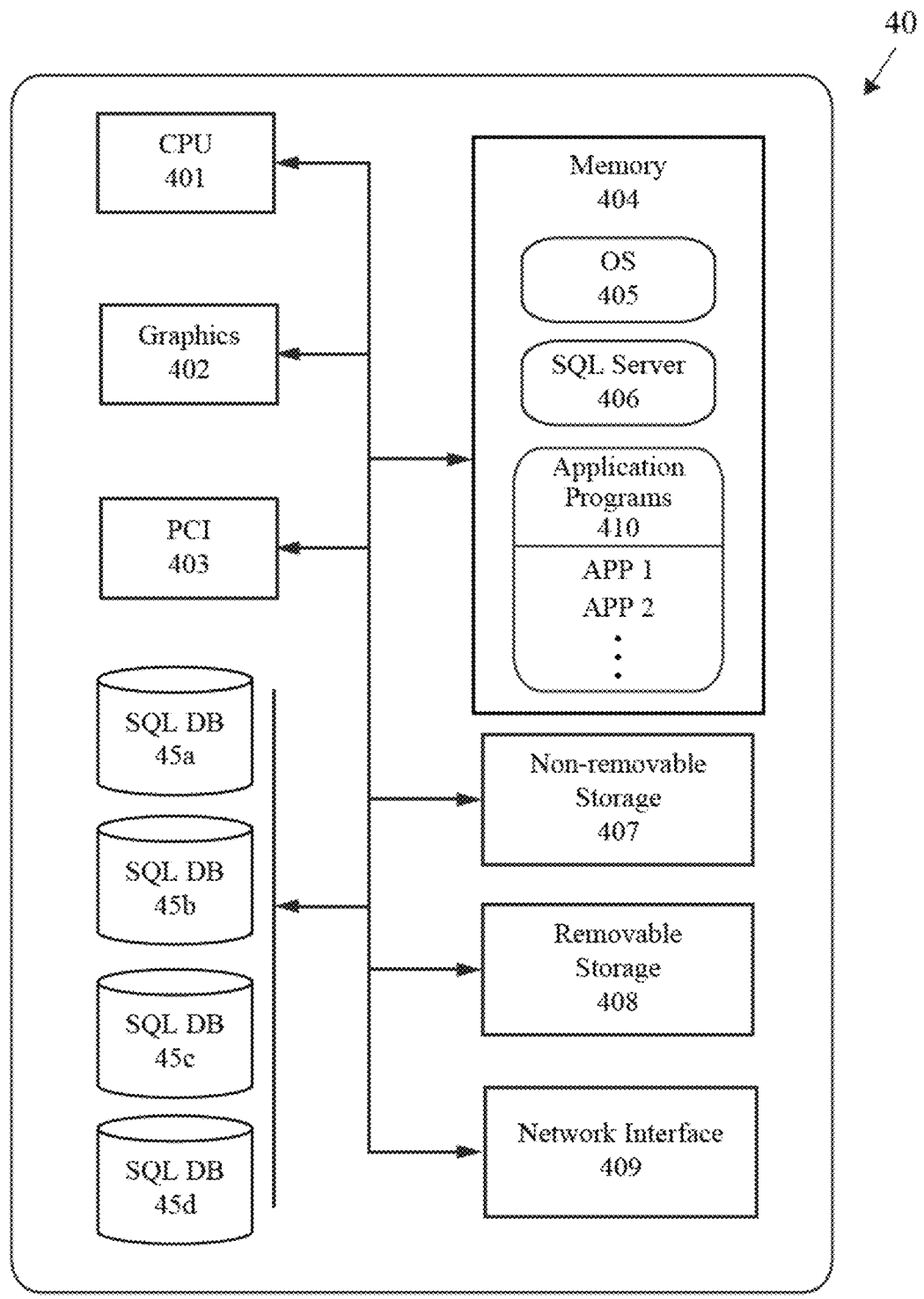
FIG. 5 is an isolated view of general electrical components of a server.

Components of a cloud computing server 140 of the system 100, as shown in FIG. 5, preferably includes a CPU component 401, a graphics component 402, PCI/PCI Express 403, memory 404, non-removable storage 407, removable storage 408, Network Interface 409, including one or more connections to a fixed network, and SQL database(s) 45a-45d, which includes the venue's CRM. Included in the memory 404, is an operating system 405, a SQL server 406 or other database engine, and computer programs/software 410. The venue server 40 also includes at least one computer program configured to receive data uploads and store the data uploads in the SQL database. Alternatively, the SQL server can be installed in a separate server from the venue server 40.

Figure 6:
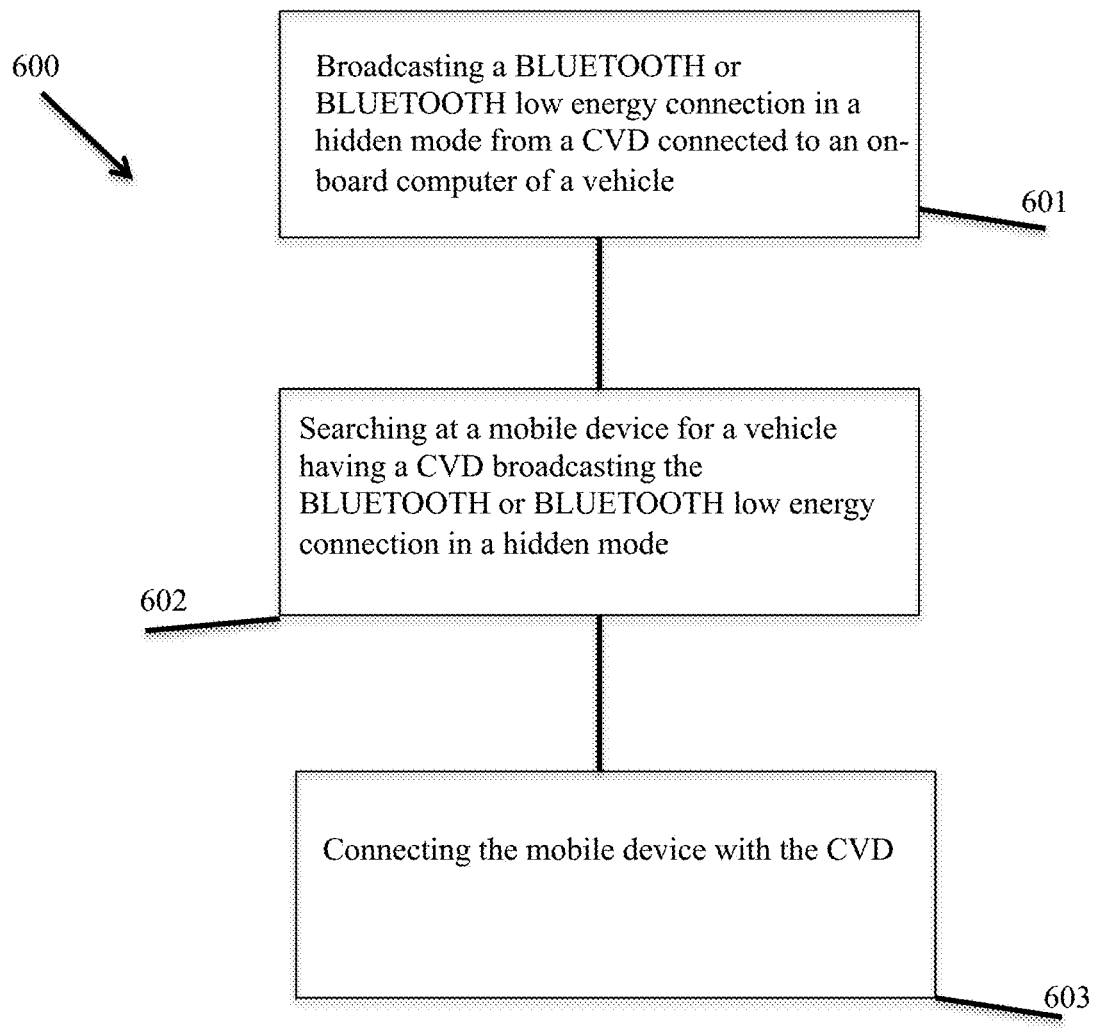
FIG. 6 is a flow chart of method for securely connecting a wireless device to a single access point in a vehicle.

A flow chart for a method 600 for a secure connection to a wireless network of a vehicle is shown in FIG. 6. At block 601, the CVD broadcasts a BLUETOOTH signal, with an encrypted, MAC address for the CVD. At block 602, leveraging the known vehicle data and the encryption algorithm a mobile device searches for a vehicle having a CVD broadcasting the BLUETOOTH wireless network. At block 603, the mobile device is paired with the CVD.

Figure 7:
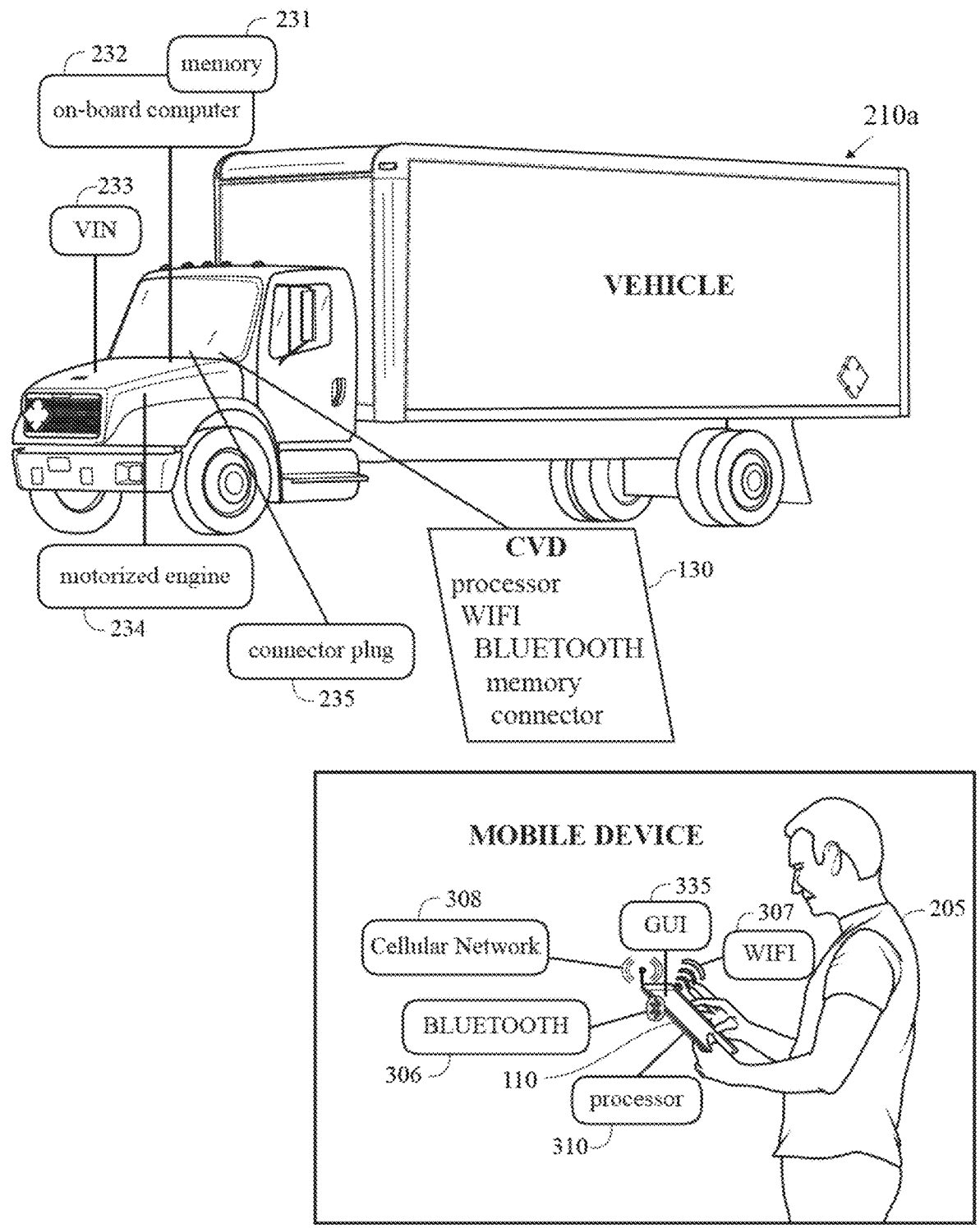
FIG. 7 is an illustration of a system for securely connecting a wireless device to a single access point in a vehicle.

A system for a secure connection to a wireless network of a vehicle is shown in FIG. 7. A truck 210a. Those skilled in the pertinent art will recognize that the truck 210a may be replaced by any type of vehicle (such as a bus, sedan, pick-up, sport utility vehicle, limousine, sports car, delivery truck, van, mini-van, motorcycle, and the like) without departing from the scope of spirit of the present invention. The truck 210a preferably comprises a motorized engine 234, a vehicle identification number ("VIN"), an on-board computer 232 with a memory 231 and a connector plug 235. The on-board computer 232 preferably has a digital copy of the VIN in the memory 231. The on-board computer 232 is preferably in communication with the motorized engine 234. The truck 210a may also have a GPS component for location and navigation purposes, a satellite radio such as SIRIUS satellite radio, a driver graphical interface display, a battery, a source of fuel and other components found in a conventional long distance truck.

Also in the truck 210a is a CVD 130 comprising a processor, a WiFi radio, a BLUETOOTH radio, a memory and a connector to connect to the connector plug of the on-board computer 232.

A driver 205 preferably has a mobile communication device such as a tablet computer 110 in order to pair with a wireless network generated by the CVD 130 of the truck 210a. The tablet computer 110 preferably comprises a graphical user interface 335, a processor 310, a WiFi radio 307, a BLUETOOTH radio 306, and a cellular network interface 308.

Figure 8:
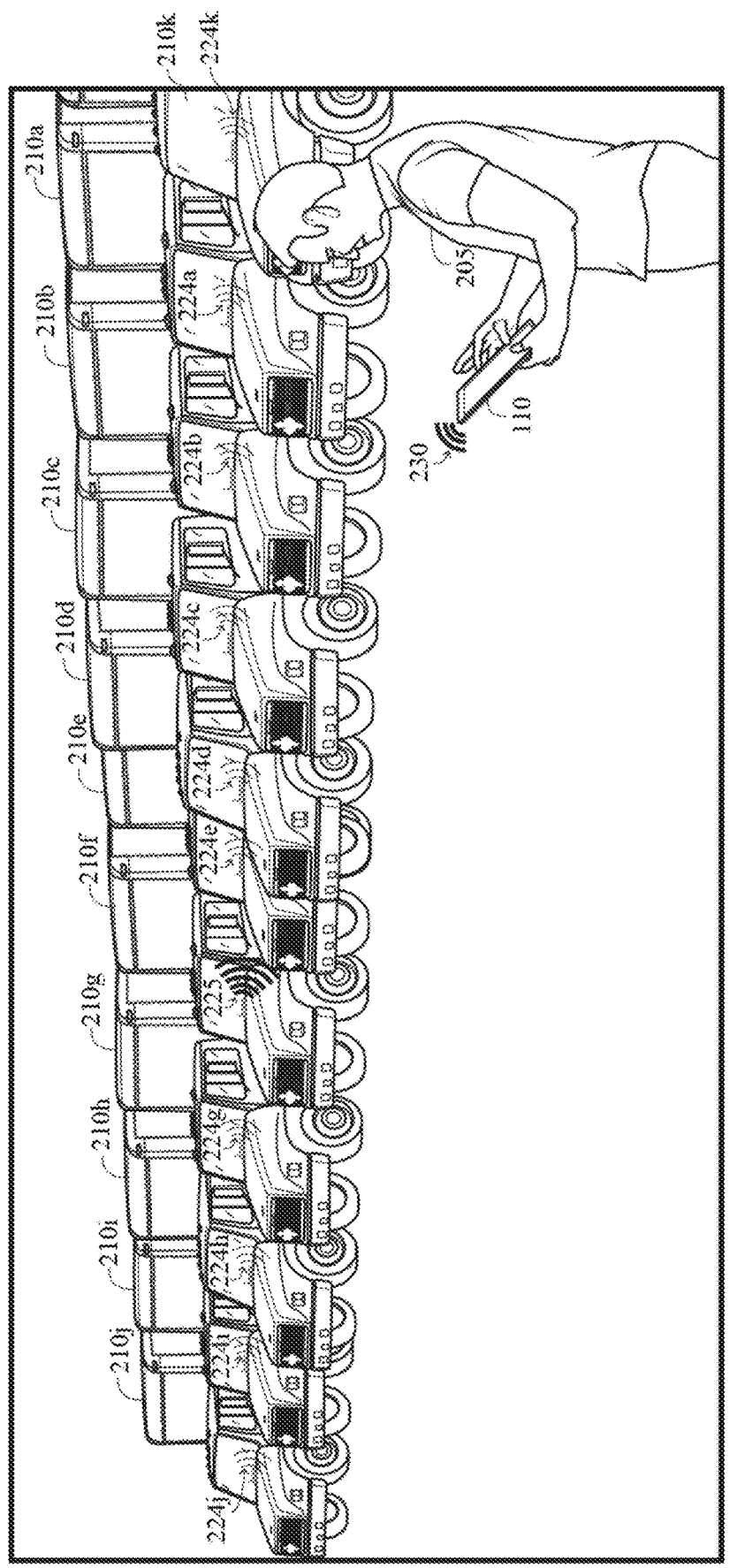
FIG. 8 is an illustration of a driver identifying a vehicle through connection of a tablet computer to an unpublished network.

As shown in FIG. 8, each of a multitude of trucks 210a-210k broadcast a wireless signal 224a-k for a truck specific network, with one truck 210f broadcasting a wireless signal 225. However, all of the wireless signal 224a-224k and 225 broadcast in a BLUETOOTH signal in a hidden mode so that a mobile device 110 must already be paired with the CVD 130 of the truck 210 in order to connect to the truck based wireless network 224a-224k or 225 of each of the CVDs 130 of each of the trucks 210a-210k. A driver 205 in possession of a tablet computer 110 pairs with the specific truck wireless network 225 of the CVD 130 of the truck 210f, and thus the driver locates the specific truck 210f he is assigned to in a parking lot full of identical looking trucks 210a-210k.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes modification and substitutions of equivalents may be made therein without departing from the spirit and scope of this invention which is intended to be unlimited by the foregoing except as may appear in the following appended claim. Therefore, the embodiments of the invention in which an exclusive property or privilege is claimed are defined in the following appended claims.

We claim as our invention the following:

1. A system for vehicle to mobile device secure wireless communications, the system comprising:
   a vehicle comprising an on-board computer with a memory having a vehicle identification number (VIN), a connector plug, and an motorized engine;
   a connected vehicle device (CVD) comprising a processor, a WiFi radio, a BLUETOOTH radio, a memory, and a connector for mating with the connector plug of the vehicle; and
   a mobile device comprising a graphical user interface, a processor, a WiFi radio, a BLUETOOTH radio, and a cellular network interface;
   wherein the CVD is configured to broadcast a BLUETOOTH or BLUETOOTH low energy connection in a hidden mode;
   wherein the mobile device is configured to search for a vehicle having the CVD broadcasting the BLUETOOTH or BLUETOOTH low energy connection in the hidden mode;
   wherein the mobile device is configured to connect with the CVD.

2. The system according to claim 1 wherein the mobile device is a tablet computer.

3. The system according to claim 1 further comprising a server for validating the pairing of the mobile device with the CVD.

4. The system according to claim 1 wherein the vehicle is a delivery truck.

5. The system according to claim 1 wherein the CVD uses a BLUETOOTH or BLUETOOTH low energy communication protocol.

6. The system according to claim 1 wherein the CVD obtains a vehicle identification number (VIN) from the on-board computer.

7. A method for a secure connection to a wireless network of a vehicle, the method comprising:
   broadcasting a BLUETOOTH or BLUETOOTH low energy connection in a hidden mode from a CVD connected to an on-board computer of a vehicle;
   searching at a mobile device for a vehicle having a CVD broadcasting the BLUETOOTH or BLUETOOTH low energy connection in a hidden mode;
   connecting the mobile device with the CVD;

wherein the vehicle comprises the on-board computer with a memory having a vehicle identification number (VIN), a connector plug, and an motorized engine;

wherein the CVD comprises a processor, a WiFi radio, a BLUETOOTH radio, a memory, and a connector for mating with the connector plug of the vehicle; and wherein the mobile device comprises a graphical user interface, a processor, a WiFi radio, a BLUETOOTH radio, and a cellular network interface.

8. The method according to claim 7 wherein the mobile device is a tablet computer.

9. The method according to claim 7 further comprising a server for validating a pairing of the mobile device with the CVD.

10. The method according to claim 7 wherein the vehicle is a delivery truck.

11. The method according to claim 7 wherein CVD uses a BLUETOOTH or BLUETOOTH low energy communication protocol.

12. The method according to claim 7 wherein the CVD obtains a vehicle identification number (VIN) from the on-board computer.

13. A method for finding a specific vehicle in a vehicle depot, the method comprising:

broadcasting a BLUETOOTH or BLUETOOTH low energy wireless connection in a hidden mode from a CVD connected to an on-board computer of a vehicle in the vehicle depot, wherein the wireless connection is only viewable to a previously paired mobile device, wherein the vehicle depot comprises a plurality of vehicles;

searching at a mobile device for a vehicle having a CVD broadcasting the BLUETOOTH or BLUETOOTH low energy wireless connection in a hidden mode, the mobile device previously paired to the CVD; and connecting the mobile device with the CVD, which allows a driver to find a specific vehicle.

14. The method according to claim 13 wherein the vehicle comprises the on-board computer with a memory having a vehicle identification number (VIN), a connector plug, and an motorized engine.

15. The method according to claim 13 wherein the CVD comprises a processor, a WiFi radio, a BLUETOOTH radio, a memory, and a connector for mating with the connector plug of the vehicle.

16. The method according to claim 13 wherein the mobile device comprises a graphical user interface, a processor, a WiFi radio, a BLUETOOTH radio, and a cellular network interface.

17. The method according to claim 13 wherein the mobile device is a tablet computer.

18. The method according to claim 13 further comprising a server for validating a pairing of the mobile device with the CVD.

19. The method according to claim 13 wherein the vehicle is a delivery truck.

20. The method according to claim 13 wherein the CVD uses a BLUETOOTH or BLUETOOTH low energy wireless communication protocol.

* * * * *